R. S. SMITH.
TENSION INDICATOR FOR DRAWING PRESSES.
APPLICATION FILED APR. 7, 1919.

1,417,579.

Patented May 30, 1922.
2 SHEETS—SHEET 1.

WITNESSES:

INVENTOR
REUBEN STANLEY SMITH
BY
Erwin, Wheeler & Woolard
ATTORNEYS.

R. S. SMITH.
TENSION INDICATOR FOR DRAWING PRESSES.
APPLICATION FILED APR. 7, 1919.

1,417,579.

Patented May 30, 1922.
2 SHEETS—SHEET 2.

INVENTOR
REUBEN STANLEY SMITH

BY Erwin, Wheeler & Woolard
ATTORNEYS.

UNITED STATES PATENT OFFICE.

REUBEN STANLEY SMITH, OF MILWAUKEE, WISCONSIN, ASSIGNOR TO A. O. SMITH CORPORATION, OF MILWAUKEE, WISCONSIN, A CORPORATION OF NEW YORK.

TENSION INDICATOR FOR DRAWING PRESSES.

1,417,579.  Specification of Letters Patent.  Patented May 30, 1922.

Application filed April 7, 1919. Serial No. 288,084.

*To all whom it may concern:*

Be it known that I, REUBEN STANLEY SMITH, a citizen of the United States, residing in the city of Milwaukee, in the county of Milwaukee and State of Wisconsin, have invented a certain new and useful Improvement in Tension Indicators for Drawing Presses, and do hereby declare that the following is a full, clear, and exact description thereof, such as will enable persons skilled in the art to which the invention pertains to make and use the same, reference being had to the drawings hereto attached for disclosure as to certain details of construction and arrangement.

This invention relates to gauges for indicating the strains in presses used in drawing metal blanks into the desired shape.

The devices embodying this my present invention are designed particularly for use in conjunction with the drawing presses which form elements of the assemblage disclosed in my application Serial No. 212,934, filed Jan. 21, 1918, which has matured into Patent No. 1,397,020, November 15, 1921, such assemblage including machines which by their related and successive operations, punch from metal plates or sheets the side and cross bar and other blanks used in constructing automobile or other vehicle frames, shape such blanks according to the particular requirements pertaining to each, perform the necessary milling operations thereon, assemble the several constituent parts, and secure all of such parts firmly in their respective positions by means of rivets, so that in a continuous operation of mechanical devices a completed automobile or other vehicle frame is automatically produced. But the present invention, however, is capable of use in blanking and drawing or other presses of all types, regardless of the character of the work produced by such presses.

My present invention embodies improvements in tension gauges for drawing presses in general, as well as in other structures in which the power is in excess of the strength of the materials used, and in which close adjustments are required in connection with such heavy pressure upon the work as to make it impractical to interpose resilient cushioning devices.

In a drawing press operated by crank motion or toggle mechanism, it is desirable that the direct pressure exerted by the crank or by the toggle shall be communicated to the punch without interposing cushioning or other devices capable of yielding to any material extent. Therefore, a slight variation in the thickness in the blanks fed to the press, or variations from the correct adjustment are apt to develop destructive strains in the mechanism of the press itself.

The object of my invention is to provide means whereby the degree of pressure exerted by the press may not only be indicated, but whereby the press itself may be stopped in case the pressure exerted upon the work exceeds a predetermined maximum, and damage to the press be prevented.

Referring to drawings accompanying this specification:

Like parts are identified by the same reference characters throughout the several views.

Figure 1:
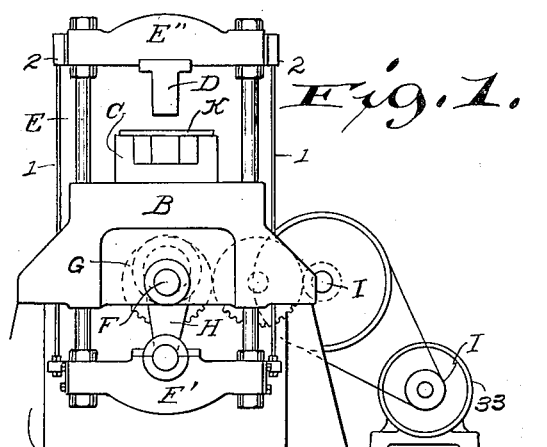
Figure 1 is an end elevation of a portion of a drawing press to which my invention has been applied as an attachment thereto.
Figure 3:
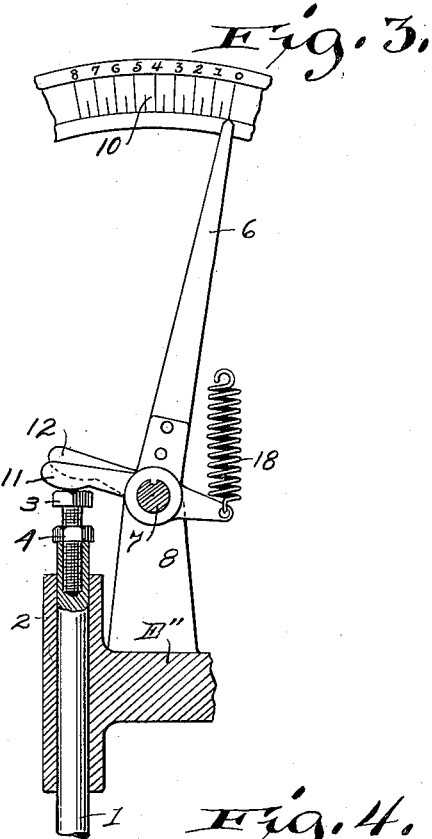
Figure 3 is an enlarged detail view in front elevation of the indicator showing a portion of the press frame and the indicator pivot rod in section.
Figure 5:
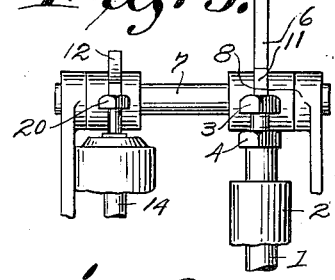
Figure 5 is a view from the left of Figure 3.
Figure 2:
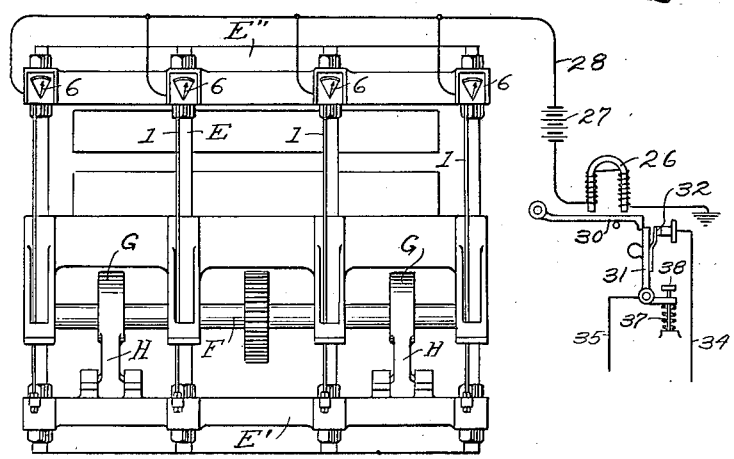
Figure 2 is a front elevation of the same with the toggle connections indicated diagrammatically.

In the drawings, Figs. 1 and 2, the main frame A, table B, matrix C, plunger D, sliding frame or pressure applying carrier members E, E', and E", shaft F, eccentric G, crank connecting member H, and driving connections I may all be of ordinary construction. Further description of these parts is therefore deemed unnecessary.

In the construction shown I have attached a set of indicator rods 1 to the lower cross head E' of the sliding frame. The upper ends of these rods are mounted to slide in bearings 2 in the upper cross head E" and the extremities of these rods are preferably made adjustably extensible. The extensible member may constitute a screw 3 seated in a threaded socket in the upper end of the rod 1 in each case. A lock nut 4 may be employed to maintain the adjustment.

A spring actuated pointer 6 may be secured to an oscillatory shaft or rod 7 journaled in bearing members 8 connected with cross head E". The free end of this pointer swings along a segmental index gauge 10, and shaft 7 is provided with a pair of arms 11 and 12 arranged with the arm 11 bearing upon the upper end of the indicator rod 1, i. e., upon the head of the screw 3. Arm 12 bears upon the upper end of a resiliently supported circuit closing rod 14 which constitutes one terminal of a latch controlling circuit closed by depressing terminal member 14 to a relatively stationary contact terminal 15 included in the same circuit and mounted in insulating bearings 16 carried by cross head E".

Normally, indicator rod 1 will be so adjusted in length as to support arm 11 with the pointer 6 in registry with the zero mark on the index segment 10. A coiled spring 18 tends to swing the pointer in the opposite direction but is prevented from doing so by the support afforded by the indicator rod 1. During the operation of the press, however, the rods E of the slide will stretch under the heavy pressure exerted upon the lower cross head E' by the crank or connecting member H when the punch D engages the work K to force it into the matrix C. The heaviest pressure will be exerted during the initial and final work shaping movements of the punch, and as the rods E of the sliding frame are stretched under these pressures, the indicator rods 1 will each have a relative downward movement with reference to cross head E". These rods are connected to the sliding frame only at their lower ends, and such connection may be a positive one, as in Fig. 1, or be effected by gravitation, as in Fig. 6, the latter manner of connection being fully efficient.

As the punch D meets with resistance the indicator rods 1 will move downwardly, the supporting pressure of each upon the under side of the corresponding pointer arm 11, will allow the pointer 6 to swing to the left under the pull exerted by spring 18. The degree to which the pointer 6 swings to the left will, therefore, register the degree of pressure exerted upon the punch D.

But as the pointer 6 swings to the left in correspondence with the downwardly swinging movement of the controlling arm 11, arm 12, rigidly connected with the pointer pivot shaft 7, will also swing downwardly and will eventually strike the head of adjusting screw 20 on the upper end of the sliding terminal 14, after which a continued movement of arm 12 in the same direction, will compress spring 21 which normally supports this sliding terminal 14 whereby said terminal moves into contact with the relatively stationary contact terminal 15, thereby closing a circuit through the winding on an electromagnet 26. This circuit is established from a battery or other source of electrical energy 27 through line 28, fixed contact terminal 15, and movable terminal 14, the latter being grounded to the machine frame. From the ground, the circuit is completed through the winding of the electromagnet 26 and back to the battery 27. The electro-magnet 26 will, when energized, lift its armature 30, the latter serving as a trip latch to hold the switch lever 31 in circuit closing relation to a terminal 32, included in a motor clutch controlling circuit of motor 33. Said controlling circuit is represented by lines 34 and 35, which connect respectively with terminal 32, and switch 31. Switch 31 may be operated by gravity, or, if desired, its motion may be accelerated by a spring 37 and limited by a headed stop rod 38.

In the construction illustrated, the motor 33 is employed to drive the press through the motion transmitting connections I above referred to. It is not essential to my invention, however, that an electric motor be employed, since any means, whereby motion may be transmitted from an indicator rod 1 to disconnect the driving or power supplying motor will be within the scope of my invention, regardless of the character of the motive power employed. It is also obvious that the pointer 6 and gauge 10 may be dispensed with, if desired, without departing from the scope of my invention, and any suitable connections may be employed to transmit stretching or displacement movements from the punch carrier to a motor unclutching device without departing from the scope of my invention.

An adjustment of the screw 3 not only fixes the normal position of the pointer, but also determines the degree of permitted distortion or stretching movement to be permitted before unclutching the motor. An adjustment of screw 20, however, will affect merely the degree of distortion or stretching to be permitted before the motor is unclutched.

I prefer to employ a series of indicator rods 1 on each side of the press, with each indicator rod controlling a pointer 6 and a circuit controlling device, since the strains exerted upon the different parts of the press are apt to be unequal, owing to slight variations in adjustment, or owing to variations in the thickness of the blank. Therefore by employing indicator rods on both sides of the press, and by employing a plurality of rods on each side, I am able to unclutch the motor whenever the strain becomes excessive in any part of the press.

I have referred to the stretching of the rods E of the punch supporting slide, but it will, of course, be understood that the indicator rods 1 may be employed to detect distortion in any portion of a carrier of any form adapted to be used to support and actuate the work shaping member of the press. In the construction illustrated, the rods E are the only parts which are subject to distortion and therefore the indicator rods 1 are each located in proximity to one of the rods E. The number of indicator rods corresponds with the number of rods E, whereby distortion in any one of the rods E may be separately measured and the motor unclutched as soon as such distortion becomes excessive.

Figure 6:
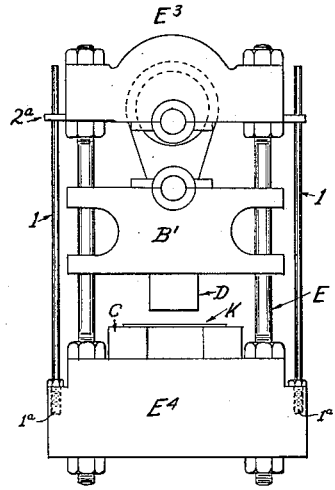
Figure 6 is a view showing a reverse arrangement of the press illustrated in Figure 1.

In Fig. 6 I have shown a modified construction, in which the frame carrying the pressure applying members is fixed, as distinguished from the construction shown in Fig. 1. In the said Fig. 6 the cross head B' carrying the plunger or die member D, is mounted to have vertical movement on the straining rods E, which latter connect the head $E^3$ and the base $E^4$. The eccentric shaft is mounted in the head $E^3$ and connected to the cross head B' as before. In this modification, each of the straining rods E will be provided with an indicator rod 1. The latter may be connected by gravitation to the base $E^4$ by resting in a socket $1^a$, formed therein, see Fig. 6, and will be free to slide through an ear or projection $2^a$, on the head $E^3$. The indicator devices previously described will be arranged for co-operation with the free end of the rods 1.

Figure 4:
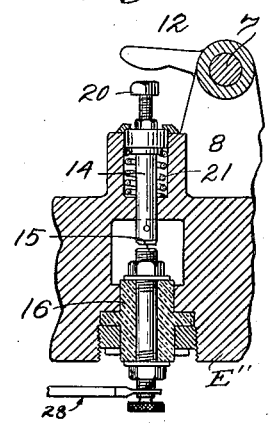
Figure 4 is a side view of the same showing the circuit closer, its mounting in the frame being illustrated in section.
Figure 7:
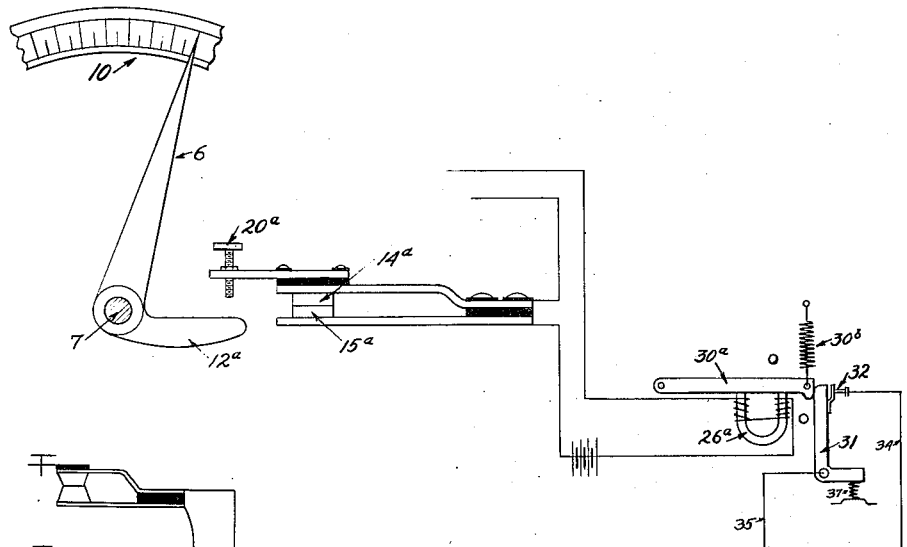
Figure 7 is a diagrammatic illustration of the indicator devices arranged for operation in connection with a closed electrical circuit.

While I have shown the devices illustrated on Sheet 1 of the accompanying drawings as operating with an open electrical circuit, I have found that the best results are secured by maintaining a closed circuit, which will be broken when the tension on the rods E becomes too great, and have illustrated in Fig. 7 one simple form of circuit breaking device. The form of circuit closer illustrated in Fig. 4 may be discarded, and the indicator rock shaft 7 will be provided with an oppositely extending arm $12^a$, in lieu of the arm 12 and thus maintain a closed circuit in the switch 31, 32, the said switch controlling the clutch which transmits the power from the motor to the press, through connections similar to those illustrated in Fig. 1. Spring pressed contact points $14^a$ and $15^a$ of the circuit breaker will be separated when the straining rods E are subjected to a tension approaching the straining point. Upon such separation the electro-magnet $26^a$ will cease to attract the armature $30^a$, and the latter will be withdrawn by the contracting spring $30^b$. This movement of the armature $30^a$ will clear its engagement with the switch lever 31 and the expansion spring 37 will thereupon break the circuit at the switch as described, and the motor will be unclutched. An adjusting screw $20^a$ is mounted in the free end of the spring plate carrying the contact point $14^a$. The said screw will be so adjusted with reference to the arm $12^a$ on the indicator rock shaft 7 that when the strain in the press becomes too great the continued movement of the rock shaft 7 will engage the arm $12^a$ with the screw $20^a$ and separate the contact points of the circuit breaker.

The drawings do not show the arms 11, 12 and $12^a$ in their exact proportions, but it will be understood that these parts will be so arranged and the screws 3, 20 and $20^a$ adjusted with such precision, that movement of the spring actuated pointer 6 over the dial segment 10 will cause the parts to control the electric circuit at the predetermined times. The circuit breakers shown in Fig. 7 will be connected in series.

Figure 9:
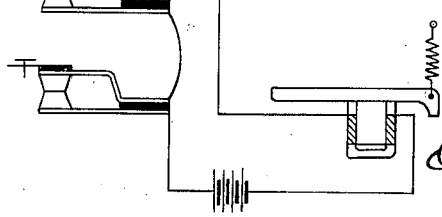
Fig. 9 is a conventional showing of the arrangement of the duplicate devices operating in connection with a closed electrical circuit.

The arrangement of the duplicate circuit breakers, one for each of the straining rods employed is indicated conventionally in Fig. 9.

If during the operation of the press, one of the straining rods E is indicated as being under too great a tension, an adjustment of the particular rod may be easily brought about, so that the strains will be equally distributed throughout the press.

It will be observed that each of the straining rods and its co-operating indicating rod are coupled together at their lower ends by being bolted to the cross head E' in Fig. 1, while in Fig. 6, I have shown the indicating rods as resting in sockets $1^a$, in the base $E^4$, to which the straining rods are connected. In the latter construction, the coupling of the indicator rod to the moving member is effected through gravitation.

Figure 8:
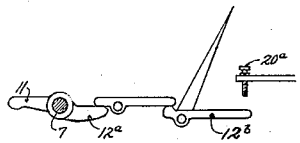
Figure 8 shows an arrangement of devices for rendering more sensitive the indications of the spring actuated pointer.

In Fig. 8, I have shown a series of multiplying levers, one of which is indicated $12^b$, interposed between the actuating arm of the rock shaft 7, and the circuit controlling devices. The purpose of this arrangement is to render the spring actuated pointer extremely sensitive and responsive when the tension rods 1, are subjected to strains. The driving clutch of the press will be operated to throw off the power immediately upon the occurrence of any such strains. The clutch

Having thus described my invention, what I desire to secure by Letters Patent is:

1. The combination with a pressure applying carrier, a driving motor operatively connected to transmit power to the carrier, an indicator rod mounted upon the power receiving end of the carrier, an index gauge mounted upon the working end of the carrier, a pointer in operative relation to the gauge and controlled as to its movement by the indicator rod, and a mechanism controlled by said indicator rod for unclutching the motor.

2. The combination with a carrier having a working member, a motor operatively connected with a portion of the carrier distant from the working member to actuate the latter, an indicator rod connected with the motor actuated portion of the carrier, and a movable member mounted on the working portion of the carrier and controlling the unclutching mechanism, said indicator rod being adapted to prevent an unclutching movement of said member except when withdrawn from such member by distension of the carrier.

3. The combination with a carrier, having a working member, an actuating motor operatively connected with the carrier, a rod supported from the carrier at the power receiving end thereof, a movable member mounted on the working portion of the carrier and normally held from motor unclutching movement by said rod, the rod and movable member being arranged to permit a motor unclutching movement of said member when the rod is relatively retracted to a predetermined extent by distortion of the carrier.

4. In a press, the combination of a work shaping member, a carrier therefor, a motor operatively connected to actuate said carrier, an automatically acting motor unclutching mechanism including a movable member connected with the working portion of the carrier, another member secured to the power receiving portion of the carrier and normally projecting into the path of said movable member to prevent a motor unclutching operation, said members, when the carrier is distorted by excessive pressure, being adapted for mutual movement sufficient to cause a motor unclutching operation.

5. In a press, the combination of a work shaping member, a carrier therefor, means for actuating the carrier, an indicating pointer pivotally mounted on the working end of the carrier, means for automatically actuating the pointer in one direction, and a member mounted upon the power receiving end of the carrier and normally preventing the operation of the pointer actuating means, said carrier being extensible under excess pressures, whereby said member may be retracted and a movement of the pointer permitted proportionate to the carrier extension, whereby the position of the pointer may indicate the degree of carrier extension.

6. In a press, the combination with a work shaping member, and member actuating connections, of a distortion indicator mounted on the actuating connections and adapted to be actuated by distortion of the actuating connections in overcoming the resistance encountered by the work shaping member.

7. In a press, the combination with a work shaping member, actuating connections therefor, and power applying means, of normally inoperative means for automatically unclutching the operation of the power applying means, and a device subject to actuation by distortion of said connections and adapted to release said automatic means for an unclutching operation.

8. In a press, a connecting member subject to longitudinal strain, a second member adjacent the connecting member and in parallel relation thereto, and an indicator device controlled by the differential stretch in said members for indicating the strains in the connecting member.

9. In a press, the combination with the movable parts of the press and the power applying means, of a device automatically controlling the power applying means and operable only during relatively yielding movements of the movable parts under excessive strains.

10. In a press, the combination with the movable parts of the press and the power applying means, of a device operable only during yielding movements of the movable parts under excess strains for indicating such strains.

11. In a press, the combination with a work shaping member, and member actuating connections, of a rod extending along said actuating connections and having one end connected therewith, the other end being movable and free from the strains to which the actuating connections are subjected, power applying means for operating the actuating connections, and a device controlled by said rod for releasing the power applying means.

12. In a press, the combination with a work shaping member, and member actuating connections, of a rod extending along said actuating connections and having one end connected therewith, the other end being movable and free from the strains to which the actuating connections are subjected, power applying means for operating the actuating connections, and a device controlled by said rod for releasing the power applying means and indicating the degree of distortion in the actuating connections due to stress.

13. In a press, the combination with a work shaping member, and a member actuating device lineally extended in the line of stress, a rod having one end connected to one end portion of said device and the other end free of stress to which said device is subjected, a spring actuated member mounted upon a portion of said actuating device distant from the point of connection of said rod therewith, and means for utilizing said rod to normally hold the spring actuated device against the tension of its actuating spring.

14. In a press, the combination with a work shaping member, and a member actuating device lineally extended in the line of stress, a rod having one end connected to one end portion of said device and the other end free of stress to which said device is subjected, a spring actuated member mounted upon a portion of said actuating device distant from the point of connection of said rod therewith, and means for utilizing said rod to normally hold the spring actuated device against the tension of its actuating spring, said spring actuated device including a pointer adapted to indicate the degree of retraction of said rod due to distortion.

15. In a press, the combination with a work shaping member, and a member actuating device lineally extended in the line of stress, a rod having one end connected to one end portion of said device and the other end free from the stress to which said device is subjected, a spring actuated member mounted upon a portion of said actuating device distant from the point of connection of said rod therewith, means for utilizing said rod to normally hold the spring actuated device against the tension of its actuating spring, said spring actuated device including a pointer adapted to indicate the degree of retraction of said rod due to distortion, and a controlling member adapted to prevent excessive distortive strains in the actuating device.

16. In a press, a tension rod subject to longitudinal strain, an indicating rod coupled therewith at one end and free at the other, a tension indicating device operated by the indicating rod and showing the strain to which the tension rod is subjected.

17. In a press, a rod subject to tension, a second rod adjacent and parallel thereto but not subject to tension, and an indicator device controlled by the differential stretch in said rods for indicating the strains in the tension rod.

18. In a press, a tension rod and parallel indicator rod, coupled at one end, and devices controlled by the indicator rod for stopping the press when the strain in the tension rod becomes excessive.

19. In a press, a frame comprising head and base members connected by a series of tension rods, a die carrying member having sliding engagement with said rods, a tension indicating device for each rod, and connections for unclutching the power when any rod is subjected to an excess of tension.

20. In a press, a series of tension rods for receiving the strains of the press and parallel indicator rods, devices co-operating with the indicator rods to indicate the strains in the tension rods, and devices actuated by the indicating devices to shift the driving clutch when the tension rods are unduly strained.

21. In a press, a bed, a frame comprising head and base members and a plurality of straining rods extending between and connecting said members, tension indicating rods parallel with the straining rods and connected at one end to one of the members of the frame, and indicating devices on the other member of the frame and cooperating with the tension indicating rods to indicate excessive strains upon the straining rods.

In testimony whereof, I have signed my name at Milwaukee, Wisconsin, this 5th day of April, 1919.

R. STANLEY SMITH.

Witnesses:
W. F. WOOLARD,
A. J. McKERIHAN.